US008692884B2

(12) United States Patent
Gish

(10) Patent No.: US 8,692,884 B2
(45) Date of Patent: Apr. 8, 2014

(54) APPARATUS AND METHOD FOR ASSESSING VISUAL ACUITY

(75) Inventor: Kurt A. Gish, Indianapolis, IN (US)

(73) Assignee: Gish Technology, Inc., Indianapolis, IN (US)

(*) Notice: Subject to any disclaimer, the term of this patent is extended or adjusted under 35 U.S.C. 154(b) by 365 days.

(21) Appl. No.: 12/884,286

(22) Filed: Sep. 17, 2010

(65) Prior Publication Data

US 2012/0069179 A1  Mar. 22, 2012

(51) Int. Cl.
  *H04N 7/18* (2006.01)

(52) U.S. Cl.
  USPC .......................................... 348/143; 348/135

(58) Field of Classification Search
  None
  See application file for complete search history.

(56) References Cited

U.S. PATENT DOCUMENTS

| | | | | |
|---|---|---|---|---|
| 5,576,890 A | * | 11/1996 | Tanaka et al. | 359/686 |
| 6,452,628 B2 | * | 9/2002 | Kato et al. | 348/333.12 |
| 6,727,938 B1 | * | 4/2004 | Randall | 348/143 |
| 6,856,695 B1 | * | 2/2005 | Nakamura et al. | 382/124 |
| 7,218,756 B2 | * | 5/2007 | Garoutte | 382/103 |
| 2004/0100563 A1 | * | 5/2004 | Sablak et al. | 348/211.4 |
| 2004/0156554 A1 | * | 8/2004 | McIntyre | 382/254 |
| 2005/0036109 A1 | * | 2/2005 | Blum et al. | 351/168 |
| 2006/0197839 A1 | * | 9/2006 | Senior et al. | 348/169 |
| 2007/0019103 A1 | * | 1/2007 | Lieberman et al. | 348/344 |
| 2007/0229680 A1 | * | 10/2007 | Kinney | 348/240.2 |
| 2007/0236769 A1 | * | 10/2007 | Zalevsky | 359/238 |
| 2010/0250765 A1 | * | 9/2010 | Riggert et al. | 709/231 |
| 2011/0027766 A1 | * | 2/2011 | Yoo et al. | 434/262 |

\* cited by examiner

*Primary Examiner* — Joseph Ustaris
*Assistant Examiner* — Zhubing Ren
(74) *Attorney, Agent, or Firm* — Woodard, Emhardt, Moriarty, McNett & Henry LLP

(57) ABSTRACT

Disclosed is an apparatus and associated method an apparatus and method for assessing visual acuity of an image captured by a digital security camera. The user is able to select a desired level of visual acuity based on displayed sample images and receive data regarding the hardware, settings, and placement required to reproduce the desired level of acuity. The sample images may account for acuity variations based on the type of object being imaged.

13 Claims, 12 Drawing Sheets

US 8,692,884 B2

APPARATUS AND METHOD FOR ASSESSING VISUAL ACUITY

FIELD OF THE INVENTION

The present disclosure generally relates to an apparatus and method for predicting and assessing visual acuity of an image to be captured by a digital security camera. More particularly, the present disclosure pertains to a system which allows a user to select a desired level of visual acuity based on displayed sample images and receive data regarding the hardware, settings, and placement required to reproduce the desired level of acuity.

BACKGROUND

Visual acuity is the acuteness or clearness of vision. Security system professionals often need to design, procure, configure, and install video surveillance cameras to achieve desired levels of visual acuity in order to meet the needs of a particular client or application. Certain objects may need to be merely detected, while others may need to be recognized or identified (such as a vehicle license plate number or a particular person's face). In addition, the resolution required to achieve identification may vary depending on the type of object being evaluated. For example, a human face may require a higher level of resolution to be identified when compared to a license plate, although the two objects are similar in size.

When designing a video surveillance system, the designer will typically have to depend on available hardware specifications which call out resolution and focal length but leave out the important component of visual acuity. The process is often based on trial an error, thus requiring costly and time consuming adjustments or even hardware replacement after the system is initially installed. Systems and methods are therefore needed to allow surveillance system designers to accurately specify and predict the camera hardware, settings and placement required to achieve a desired level of visual acuity.

SUMMARY

According to one exemplary embodiment of the present disclosure, an apparatus and method for assessing visual acuity is provided. The method includes the steps of allowing a user to select the type of object being imaged and a desired level of visual acuity. The user is then presented with an image having the selected level of visual acuity. The user is able to select varying levels of visual acuity until an image matching the desired level of visual acuity is reached. The displayed image and visual acuity level may also be based upon a particular type of camera hardware to be used in the installation, the field of view, or the distance from the camera to the object.

In certain embodiments, a selected visual acuity index is defined as a range of values between zero and one, with zero being an unusable image and one being a perfect image. To determine the number of pixels per square foot required to achieve the selected visual acuity level, the selected visual acuity level is multiplied by six. The inverse log of the result is then taken to determine the number of required pixels per square foot, which may then be converted to pixels per linear foot. This number may be optionally multiplied by an additional object type factor to account for differences in the visual acuity level typically present in images of objects of that type (e.g., human face, license plate, car, truck, ocean liner). The resulting number of required pixels per foot may then be used to determine and display a list of camera or sensor models having the desired resolution to produce the desired visual acuity index for the type of object being evaluated. This allows the user to predict the level of visual acuity for images depicting the selected object type which will be captured in the surveillance system being designed.

This summary is provided to introduce a selection of concepts in a simplified form that are described in further detail in the detailed description and drawings contained herein. This Summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DETAILED DESCRIPTION

Figure 1:
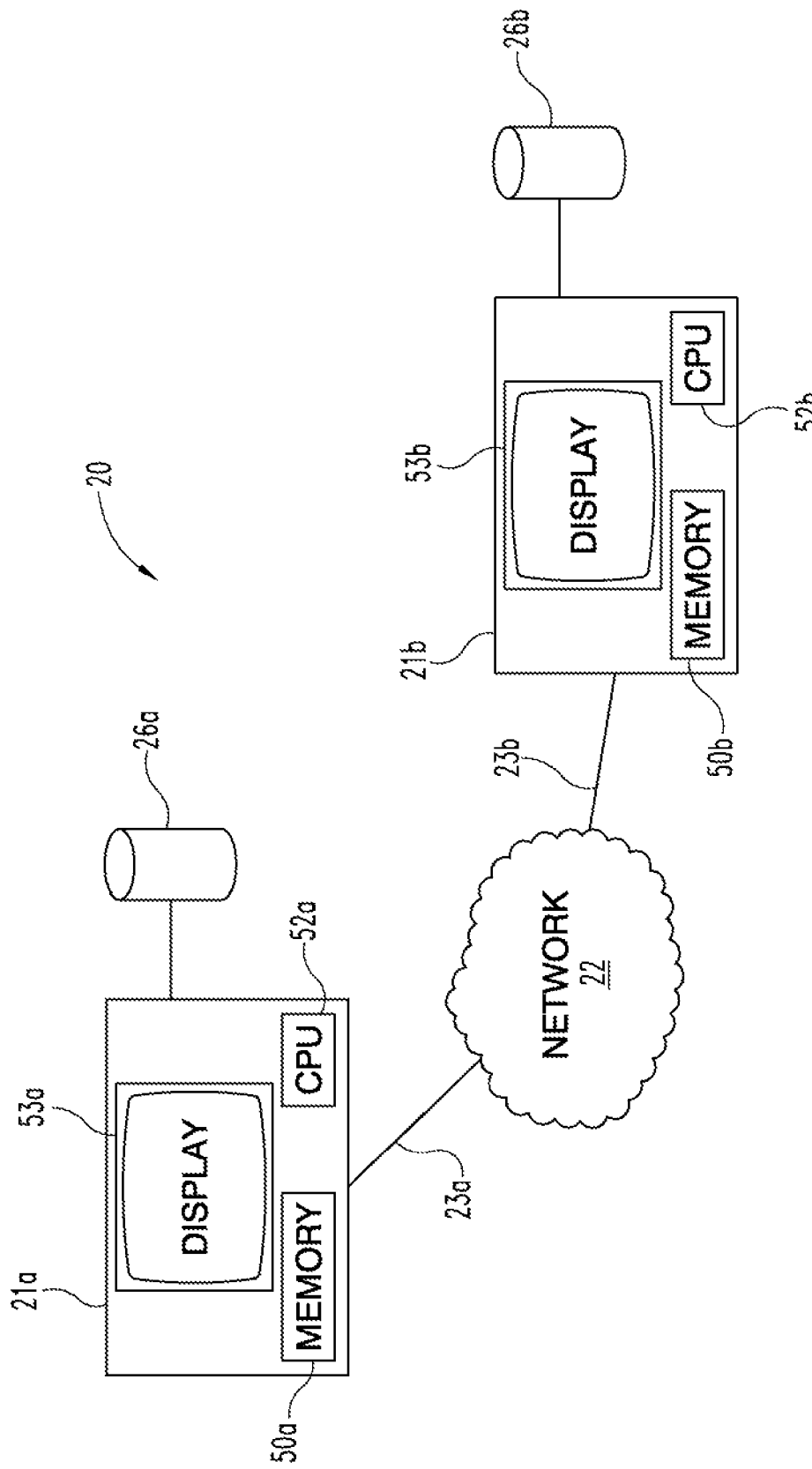
FIG. 1 is a diagrammatic view of a computer system suitable for implementing the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure, through reference to the accompanying figures, describes an apparatus and associated method that allows users to assess and/or specify the visual acuity level of an image to be produced by a camera in a video surveillance system. The apparatus allows the user, before the surveillance camera is installed, to specify with confidence that a desired level of visual acuity will be achieved in images taken of objects of interest in desired locations relative to the camera.

FIG. 1 is a diagrammatic view of computer system 20 of a preferred embodiment of the present disclosure. In one embodiment, the method for assessing visual acuity may be implemented on a single computer 21a or 21b. In other embodiments, the method may be implemented using multiple computers 21a and 21b, with data sharing and/or retrieval implemented via optional computer network 22. Computer network 22 may couple together a number of computers 21a and 21b and other devices over network pathways 23a-23b. Furthermore, it should be understood that while two computers 21a and 21b are illustrated, more or fewer may be utilized in alternative embodiments. Computers 21a-21b may be implemented as any type of computer device including a personal computer, a handheld mobile computing device (e.g., an iPhone), tablet computer or the like. Preferably, the disclosed method is implemented in a software application suitable for operation on various mobile operating systems including Microsoft Mobile, Symbian OS, Palm OS, Mobile Linux, Apple OSX (iPhone), and MXI. In other forms, the application may be browser-based and/or embedded software, to name a few non-limiting examples.

In the illustrated embodiment, computers 21a and 21b of system 20 include one or more types of memory (50a and 50b, respectively) and one or more processors or CPUs (52a and 52b, respectively). Each memory 50a and 50b preferably includes a removable memory device. Each processor 52a and 52b may be comprised of one or more components configured as a single unit. Alternatively, when of a multi-component form, any of processors 52a and 52b may have one or more components located remotely relative to the others. One or more components of each processor 52a and 52b may be of the electronic variety defining digital circuitry, analog circuitry, or both. In one embodiment, each processor 52a and 52b is of a conventional, integrated circuit microprocessor arrangement, such as one or more CORE™ processors (including CORE 2 Duo, Core i3, Core i7 and the like) or PENTIUM 4® processors supplied by INTEL Corporation of 2200 Mission College Boulevard, Santa Clara, Calif. 95052, USA. It shall be appreciated that other processors manufactured by INTEL or other suppliers would be suitable for use with the system and method described herein.

Each memory 50a and 50b (removable or generic) is one form of a computer-readable device or medium. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

In one embodiment each computer 21a and 21b may be coupled to a display and/or includes an integrated display 53a or 53b. Computers 21a and 21b may be of the same type, or a heterogeneous combination of different computing devices. Likewise, displays 53a and 53b may be of the same type, or a heterogeneous combination of different visual devices. Although again not shown to preserve clarity, each computer 21a and 21b may also include one or more operator input devices such as a keyboard, mouse, track ball, light pen, and/or microtelecommunicator, to name just a few representative examples. Also, besides a display, one or more other output devices may be included such as a loudspeaker or printer. Various display and input device arrangements are possible.

Computer network 22 can be in the form of a wireless or wired Local Area Network (LAN), Virtual Private Network (VPN), wireless cellular network, public switched telephone network, the internet, a combination of these, or such other suitable network arrangement as would occur to those skilled in the art. The operating logic of system 20 can be embodied in signals transmitted over network 22, in programming instructions, dedicated hardware, or a combination of these. It should be understood that more or fewer than computers 21a and 21b can be coupled together by computer network 22.

Data stores 26a and 26b can reside in the same or different location(s) and/or be incorporated within the computers 21. For example, data store 26a can reside within memory 50a of computer 21a. As one non-limiting example, data store 26a or 26b can exist all or in part either in a database or in one or more files within a RAID array that is operatively connected to at least one of computers 21a or 21b via network 22 or otherwise, such as through a private dedicated connection. Data store 26a and 26b may be implemented using any known form of data storage format, including relational databases, spreadsheets, basic memory list storage, or the like. Data store 26a and 26b stores the resolution, contrast, and other pertinent data related to the available cameras for retrieval by the computers 21a and 21b. Alternate arrangements may be included which shall be appreciated by those of skill in the computer arts.

Displays 53a and 53b may be implemented as a flat panel monitor, such as an LCD panel, OLED panel, plasma display, surface-conduction electron-emitter display, or the like. However, in alternate forms, displays 53a and 53b may be any other type of display, including a CRT monitor or the like. In a further preferred form, displays 53a and 53b are a touch screen display, such as a capacitive or resistive touch screen.

In one embodiment, each computer 21a and 21b may be configured as a client and server, respectively, with computer 21a providing a graphical user interface for the user and computer 21b and data store 26b providing the data regarding the individual cameras and associated hardware specifications, thereby allowing centralized control and updating of the camera hardware data.

Figure 2:
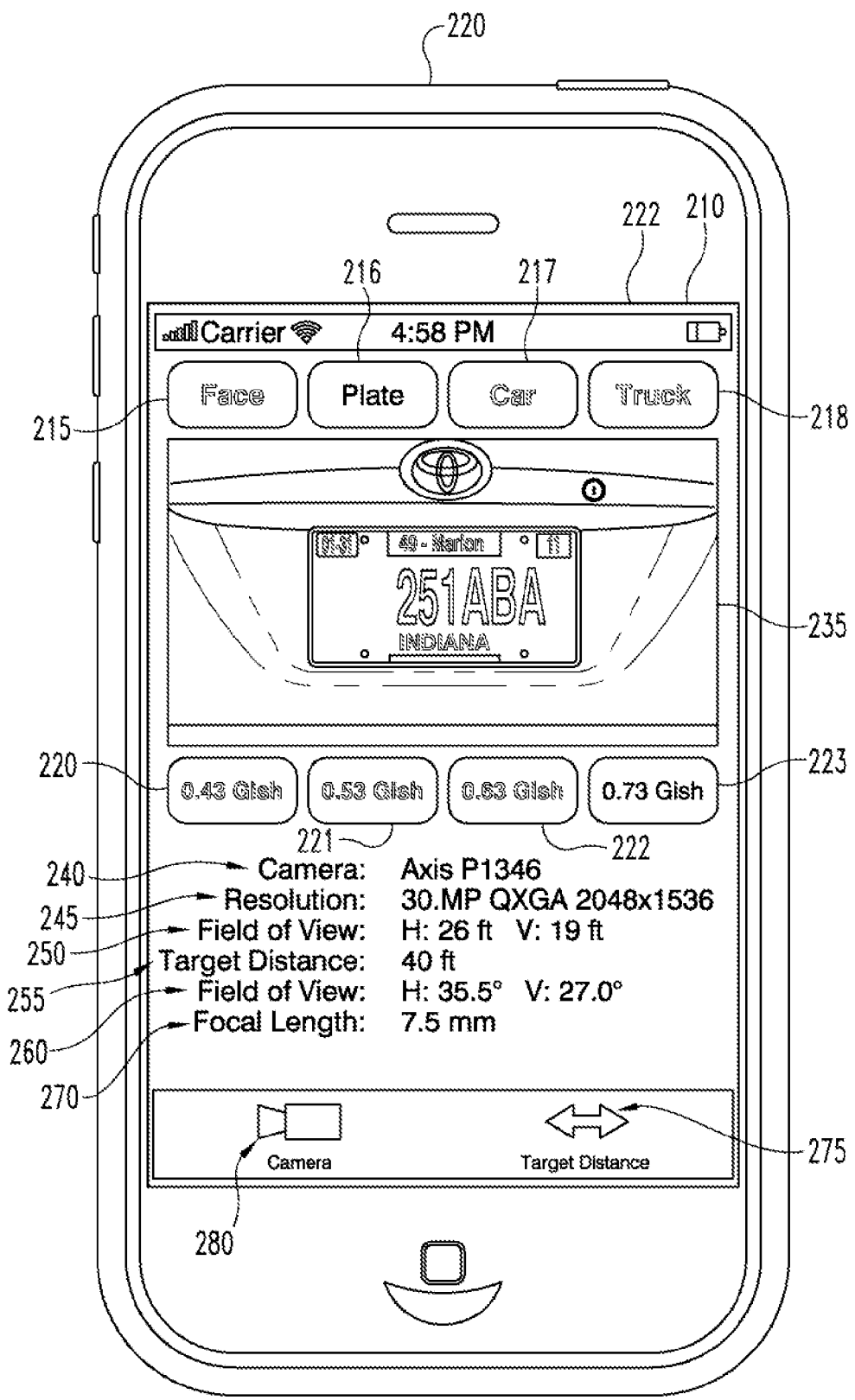
FIG. 2 is a representative illustration of a computer display screen layout for assessing visual acuity according to one embodiment.

FIG. 2 shows a graphical screen layout 210 for presenting images and visual acuity data to the user. The interface 210 is shown here as being implemented on a display 222 of a handheld mobile device 220, although other types of computing devices similar to computers 21a and 21b discussed above may be utilized. As shown, the interface 210 includes object selector controls 215-218, acuity level selector controls 220-223, target distance control 275, and camera selection control 280. It shall be understood that controls 215-230 may be implemented as "soft" controls which function as both a selectable control and as a status or data display. The user interface may also include an image display field 235 for displaying an image representative of the visual acuity level that can be achieved based on the selected settings. Data fields are further provided to indicate the currently selected or calculated values for camera model (240), resolution (245), field of view (250), target distance (255), angle of view (260), and focal length (270). In certain embodiments, the target distance data field may also display low and hi range target distance values that are possible using the selected camera (if the camera has a variable focal length lens) for the selected visual acuity index level, allowing the user to determine if an alternate focal length lens needs to be specified for the camera or other settings need to be adjusted. In other embodiments, the selected camera has a fixed focal length lens, the target distance field may list the single target distance that is required to achieve the desired acuity index level using that camera/lens combination.

Figure 3:
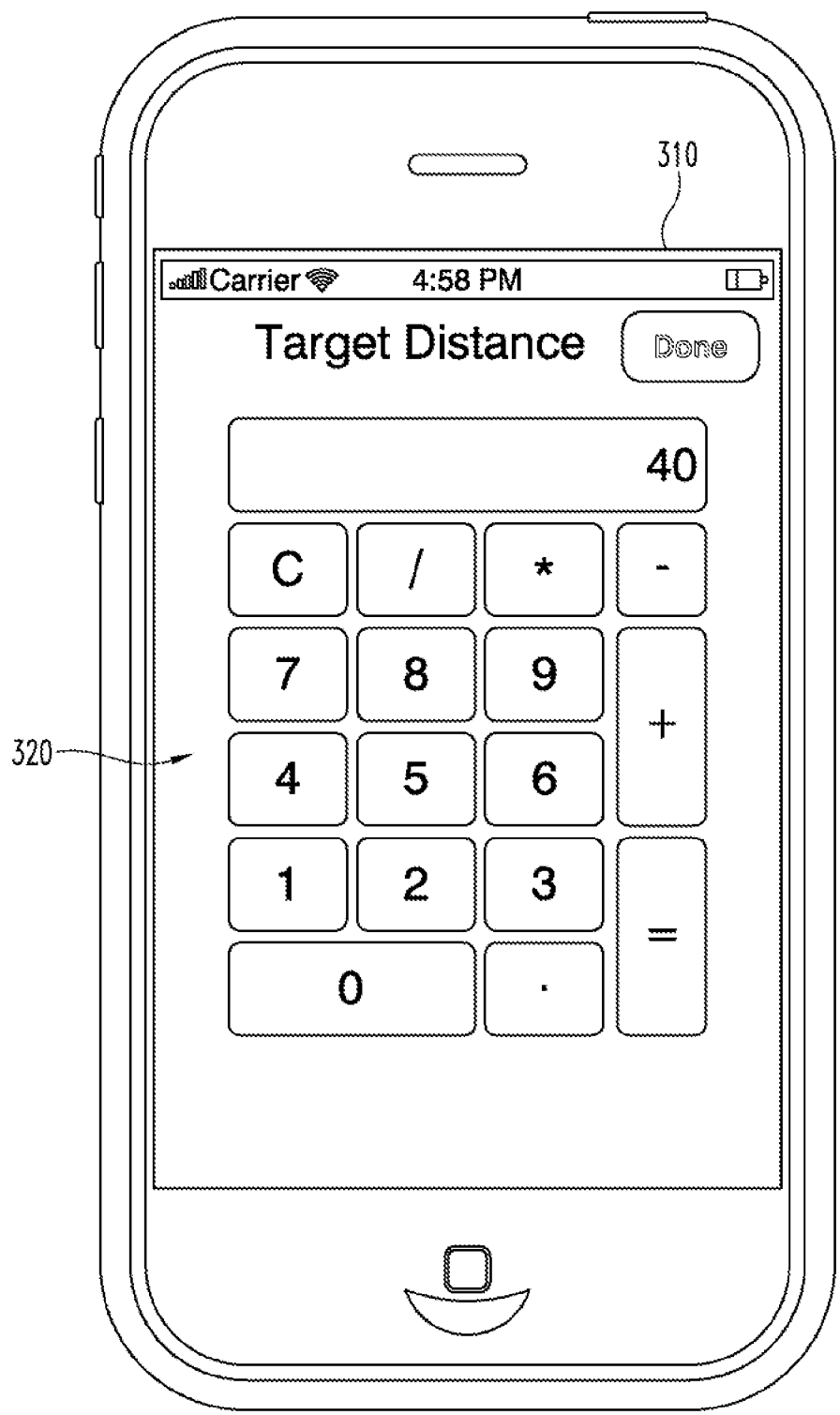
FIG. 3 is a representative illustration of a computer display screen layout for entering a target distance according to one embodiment.

FIG. 3 shows a screen layout 310 which is accessible by selecting the control 275 of FIG. 2 and allows the user to enter a target object distance using a virtual numerical keypad 320.

Figure 4:
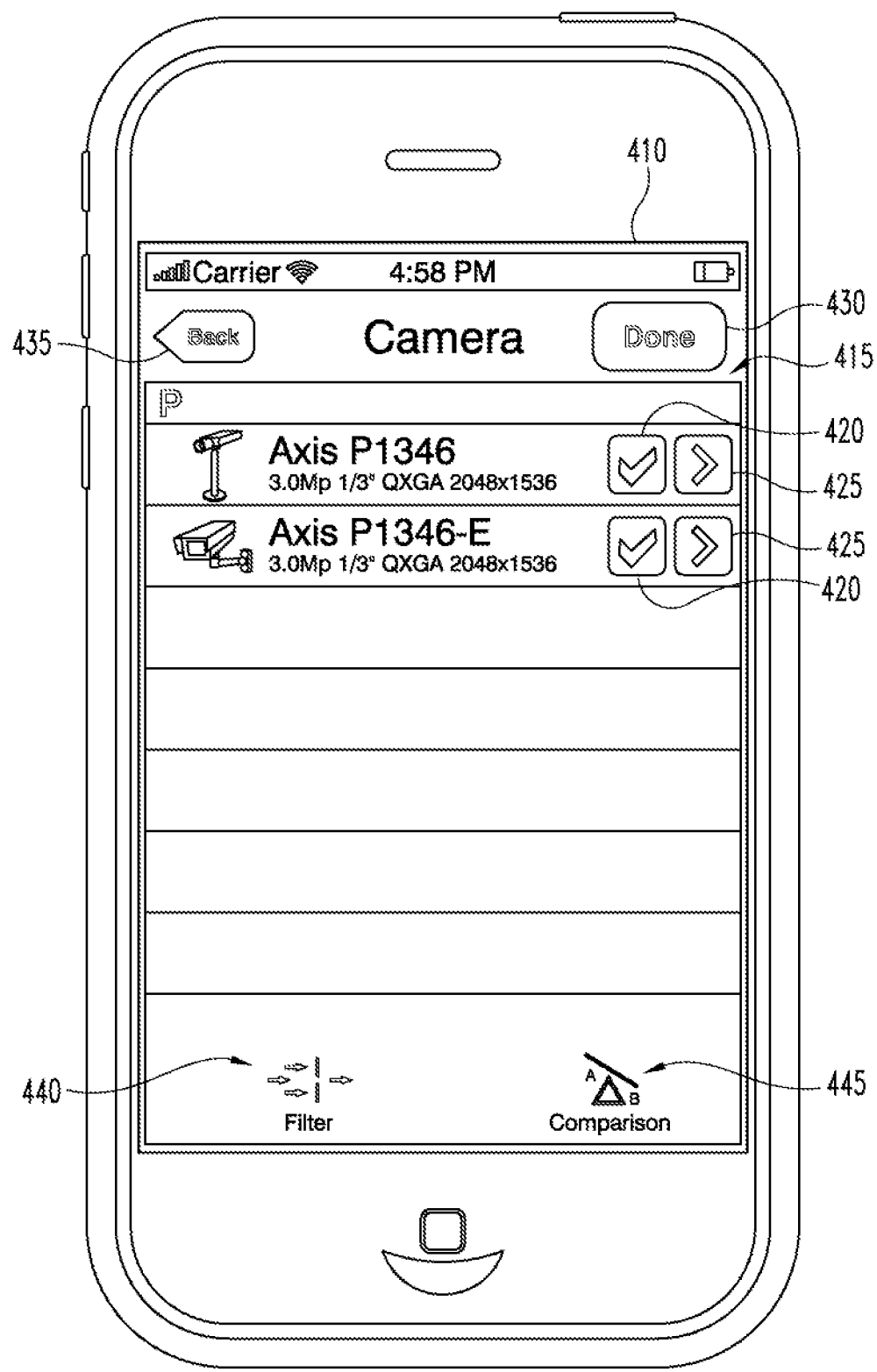
FIG. 4 is a representative illustration of a computer display screen layout for viewing a list of acceptable cameras according to one embodiment.
Figure 5:
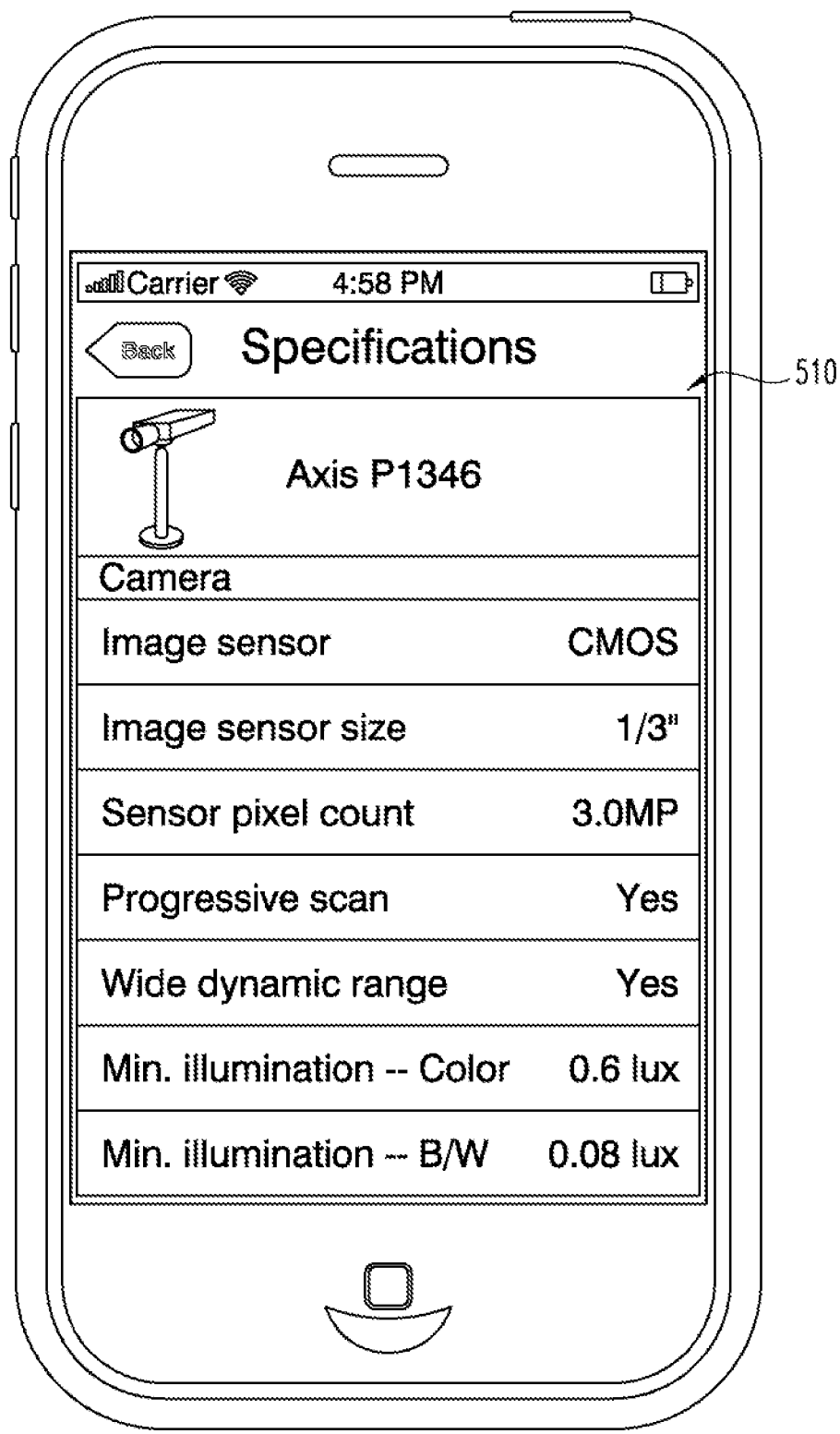
FIG. 5 is a representative illustration of a computer display screen layout for viewing hardware specifications for a selected camera according to one embodiment.

FIG. 4 shows a screen layout 410 reachable when the user physically touches or otherwise selects the control 280 of FIG. 2 and having a list 415 of available cameras which meet the criteria found in the display of FIG. 2. Controls 420 are provided to allow the user to select a particular camera to be used for visual acuity assessment. The user may select one of controls 425 to view additional information for a particular camera (as shown in FIG. 5) before deciding whether to confirm selection of the camera using control 430. Control 435 is likewise provided to allow "back" navigation when desired. Controls 440 and 445 are provided to allow the user to navigate to the displays of FIGS. 6 and 7, respectively.

Figure 6:
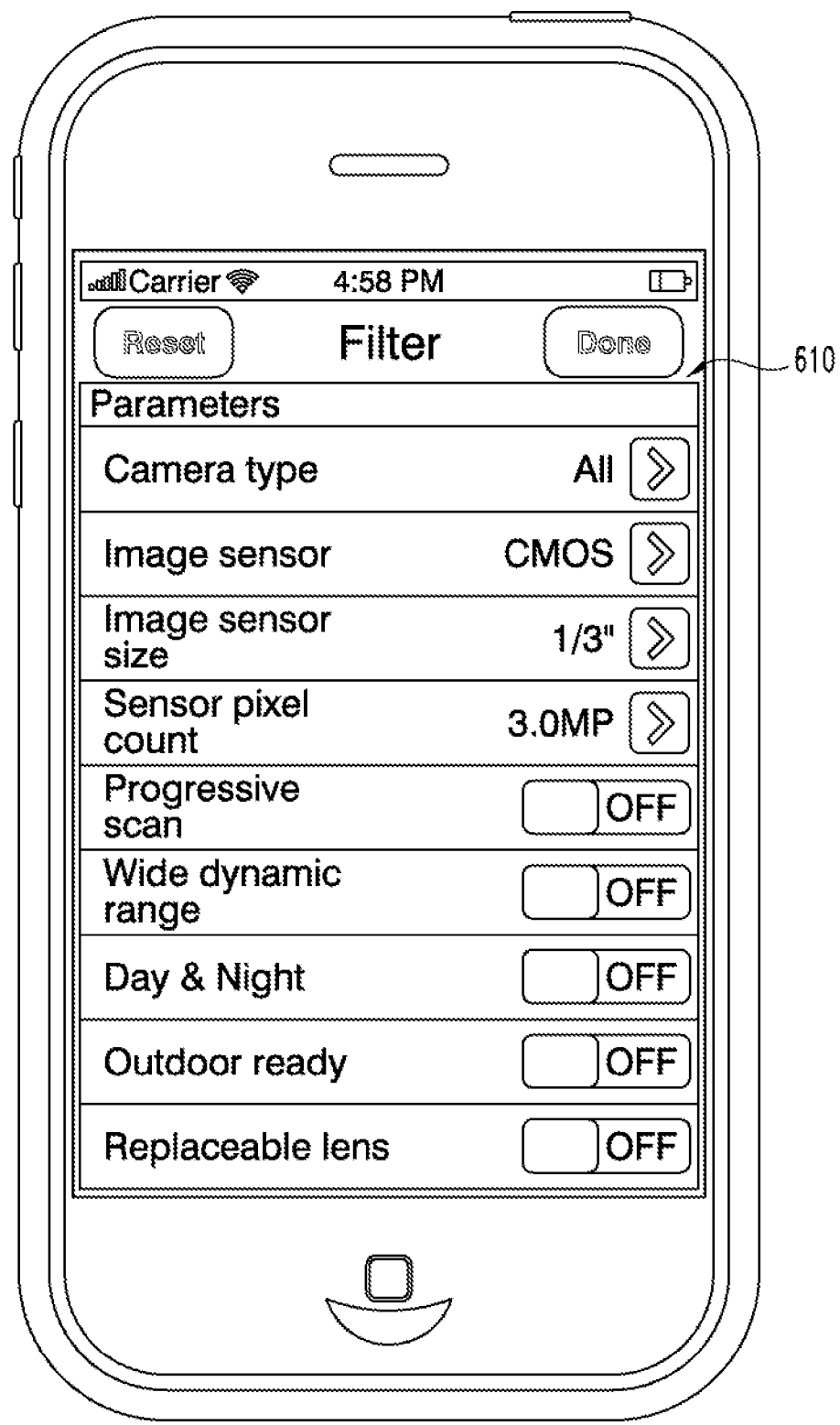
FIG. 6 is a representative illustration of a computer display screen layout for applying a filtering criteria to a list of available cameras according to one embodiment.
Figure 7:
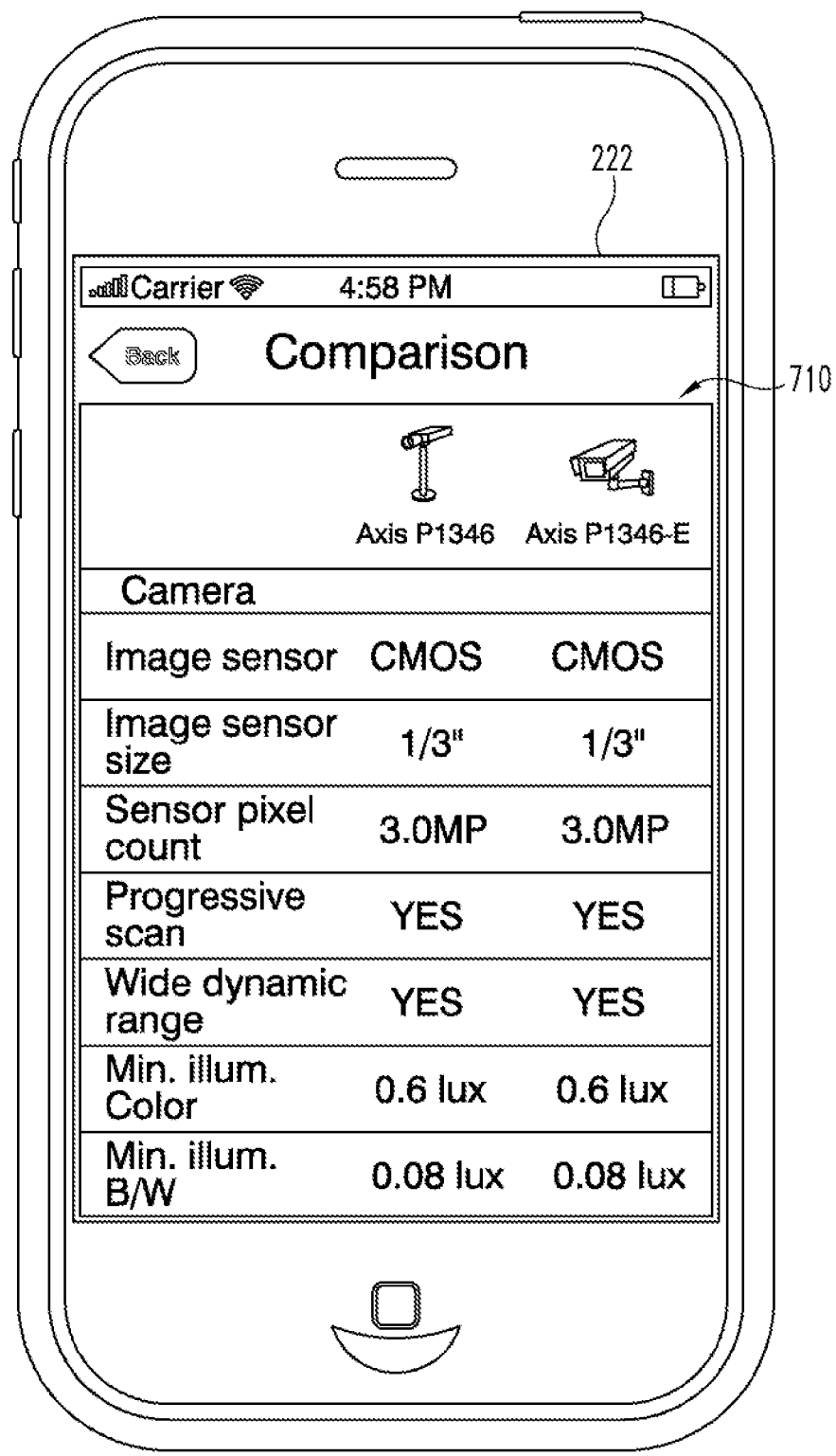
FIG. 7 is a representative illustration of a computer display screen layout for providing a comparison of multiple selected cameras according to one embodiment.

FIG. 5 shows a screen layout 510 reachable when the user selects control 420 of FIG. 4 and which lists information related to the selected camera model. FIG. 6 shows a screen layout 610 reachable when the user touches or otherwise selects control 440 of FIG. 4 and allows the displayed list of suitable cameras from FIG. 4 to be filtered based on various criteria including, but not limited to, camera type, sensor type, sensor size, pixel count, progressive scan capability, wide dynamic range capability, day and night capability, outdoor readiness, and replaceable lens capability. FIG. 7 shows a screen layout 710 reachable when the user selects control 445 of FIG. 4 and allows the user to select multiple cameras for feature comparison.

Figure 8:
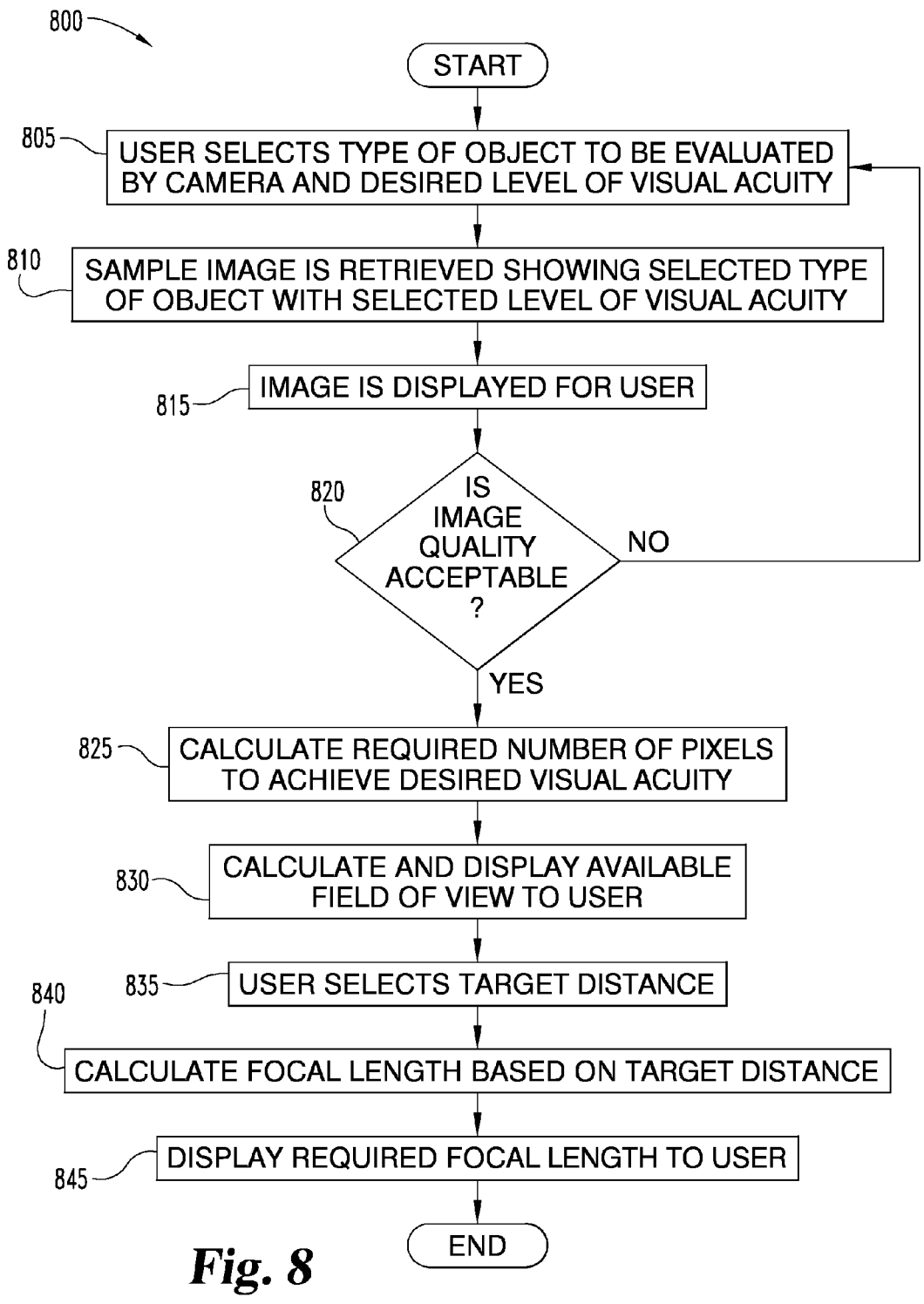
FIG. 8 is a flowchart showing one set of steps suitable for being performed in assessing visual acuity of an image based on a selected object type.
Figure 9:
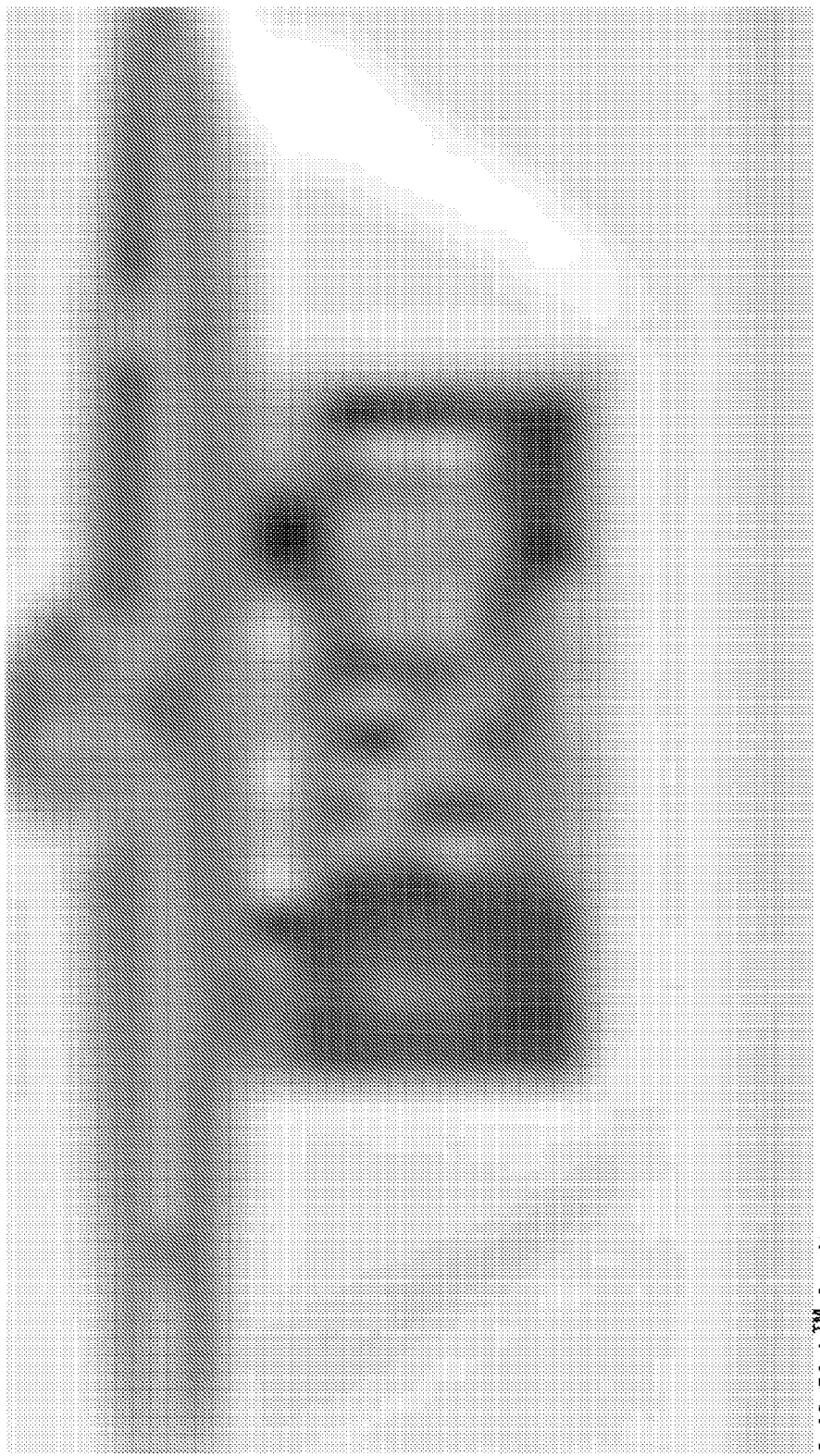
FIG. 9 is a sample image having a 0.43 Gish™ acuity level of a car rear license plate area.
Figure 10:
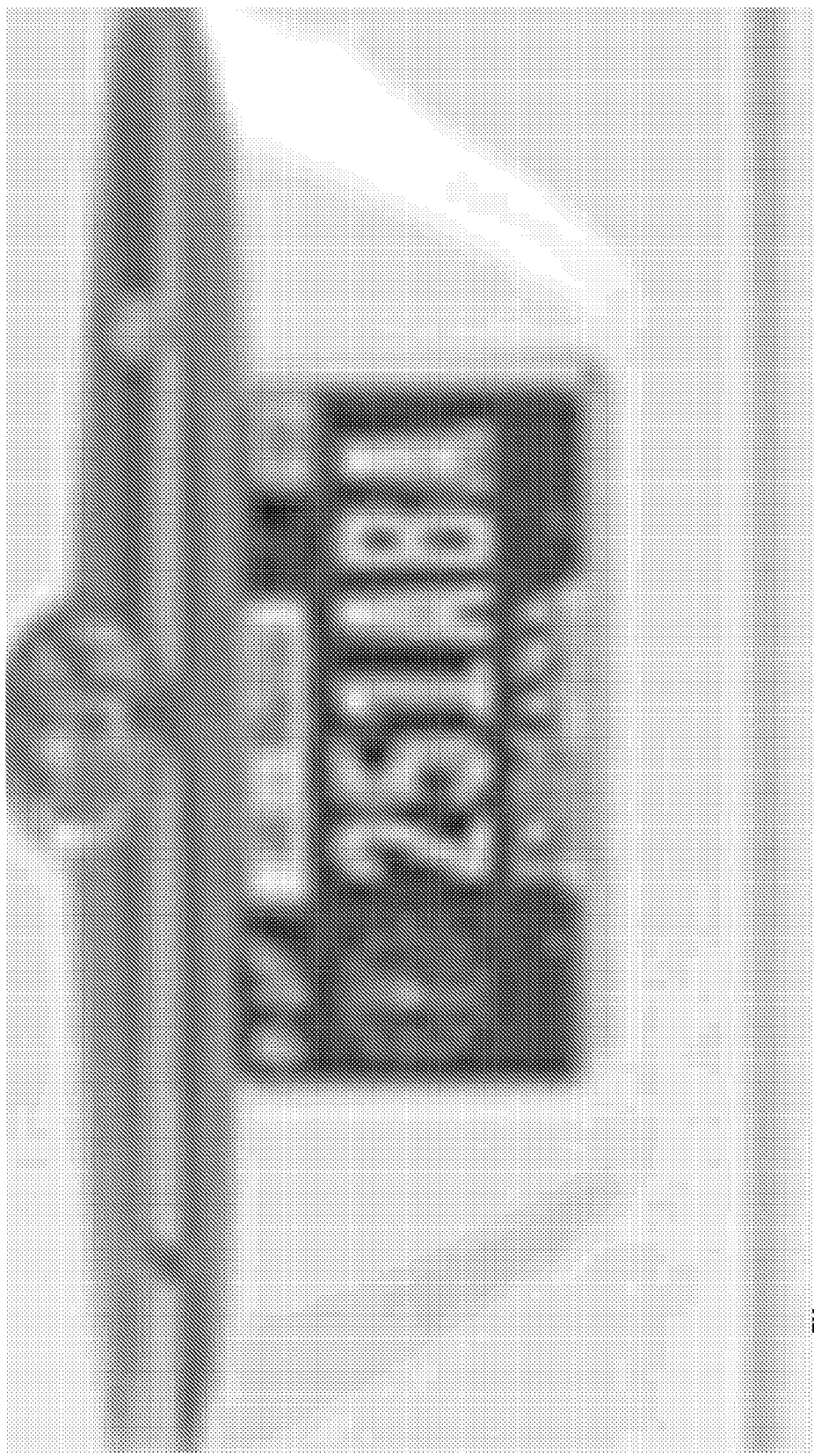
FIG. 10 is a sample image having a 0.53 Gish™ acuity level of a car rear license plate area.
Figure 11:
FIG. 11 is a sample image having a 0.63 Gish™ acuity level of a car rear license plate area.
Figure 12:
FIG. 12 is a sample image having a 0.73 Gish™ acuity level of a car rear license plate area.

Turning now to FIG. 8 with continued reference to FIGS. 1-7, a flowchart suitable for being performed by computer 21 according to one embodiment is illustrated. Process 800 is used to determine an acceptable level of visual acuity for a given object type being imaged. The process begins when the user selects an object type and a desired visual acuity level (step 805). It shall be understood that the process may also be initiated using default selections for both or one of the object type and acuity level. At step 810, an image is retrieved from the data store 26 which depicts the selected object type (e.g., a license plate) displayed at the selected acuity index level. At step 815, the retrieved image is displayed in display area 235.

At step 820, the user may confirm that the image quality is acceptable, or return to step 805 and select a higher or lower visual acuity index level. Once the user is satisfied with the displayed image and visual acuity index level, the process proceeds to step 825. FIGS. 9-12 show images having visual acuity index levels of 0.43, 0.53, 0.63, and 0.73, respectively.

At step 825, the number of pixels required to achieve the selected visual acuity level is calculated. It shall be understood that calculations may be based on a default camera selection, or based on a camera selected by the user. In one embodiment, the acuity index level is a function of the amount of sensor pixels being used to display the image and the type of object being imaged, with one million pixels corresponding to a perfect image and 1 pixel corresponding to an unusable image. The table below lists the various pixels per foot required to achieve the corresponding acuity index values according to one embodiment. As shown, an object factor of 0.83 is listed, which generally corresponds to the correction required for human face identification. However, it shall be understood that other object factors may be utilized. It has been observed that an object factor of 1 is generally suitable for car license plates, an object factor of 14 is generally suitable for cars, and an object factor of 52 is generally suitable for large trucks.

| Gish Index ™ (Visual Acuity) | Log | Pixels/ sq ft (base) | Pixels/ ft (base) | Object of Interest factor | Pixels/ ft (factored) | Pixels/ sq ft (factored) |
|---|---|---|---|---|---|---|
| 1.00 | 6.00 | 1000000 | 1000 | 0.83 | 1205 | 1452025 |
| 0.99 | 5.96 | 921600 | 960 | 0.83 | 1157 | 1338649 |
| 0.94 | 5.61 | 409600 | 640 | 0.83 | 771 | 594441 |
| 0.89 | 5.36 | 230400 | 480 | 0.83 | 578 | 334084 |
| 0.84 | 5.01 | 102400 | 320 | 0.83 | 386 | 148996 |
| 0.79 | 4.76 | 57600 | 240 | 0.83 | 289 | 83521 |
| 0.73 | 4.41 | 25600 | 160 | 0.83 | 193 | 37249 |
| 0.69 | 4.16 | 14400 | 120 | 0.83 | 145 | 21025 |
| 0.63 | 3.81 | 6400 | 80 | 0.83 | 96 | 9216 |
| 0.59 | 3.56 | 3600 | 60 | 0.83 | 72 | 5184 |
| 0.53 | 3.20 | 1600 | 40 | 0.83 | 48 | 2304 |
| 0.49 | 2.95 | 900 | 30 | 0.83 | 36 | 1296 |
| 0.43 | 2.60 | 400 | 20 | 0.83 | 24 | 576 |
| 0.39 | 2.35 | 225 | 15 | 0.83 | 18 | 324 |
| 0.33 | 2.00 | 100 | 10 | 0.83 | 12 | 144 |
| 0.00 | 0.00 | 1 | 1 | 0.83 | 1 | 1 |

To determine the number of pixels required, the selected acuity index level is first multiplied by six and the inverse log taken of the result, giving the number of pixels per square foot. By taking the square root of this value, number of pixels per foot can be obtained. In order to account for differences in the type of object being evaluated, the calculated number of pixels per foot may be divided by an object factor to determine an adjusted number of pixels per foot. As one example, if the selected acuity index level is 0.73, the log of the pixels per square foot will be calculated to be 4.41 and the pixels per square foot will be approximately 25,600. Taking the square root of the result gives approximately 160 pixels per linear foot. The pixels per linear foot is then divided by an object factor of 0.83 for the human face, resulting in an adjust value of approximately 193 pixels per linear foot. It shall be understood that while a one million pixels is used in the above example as the upper limit corresponding to a acuity index level of 1.0, other values may be used to define the upper limit as well.

At step 830, the adjusted number of pixels per linear foot is used in conjunction with the selected camera model to determine the maximum field of view that will allow the adjusted number of pixels to be used in imaging the object of interest. For example, if the required adjusted number of pixels per foot is 193 and the selected camera has a horizontal pixel count of 2048, the maximum horizontal field of view will be 2048 divided by 193, or 10.6 feet. Likewise, a vertical pixel count of 1536 for the sensor will be divided by 193, resulting in a maximum vertical field of view of 8.0 feet. The user is then able to determine if the displayed field of view is acceptable, and make changes to the camera selection or desired acuity index level until an acceptable field of view is reached.

At step 835, the user selects the desired target distance, that is, the distance from the camera lens to the object of interest. In certain embodiments, the user is presented with a range of distance values that are possible using the selected camera while still achieving the desired acuity level.

At step 840, the required focal length $L_F$ in millimeters is calculated according to equation (1) below:

$$L_F = D_T / (H_{count} / P_{mm} / H_{size}) \quad (1)$$

where DT is the target distance, $H_{count}$ is the sensor horizontal pixel count, $P_{mm}$ is the adjusted required pixels per millimeter, and $H_{size}$ is the horizontal dimension of the sensor. For example, assume the selected target distance is 12,195 millimeters (equivalent to 40 feet), the sensor horizontal pixel count is 2048, the required adjusted pixels per millimeter is 0.6299 (equivalent to 193 pixels per foot), and the horizontal length of the camera sensor is 4.8 millimeters. The required focal length would then be calculated to be (12,195)/(2048/0.6299/4.8) or approximately 18 millimeters. At step 845, the calculated focal length is displayed for the user.

In certain embodiments, the horizontal angle of view and vertical angle of view may also be calculated according to equations (2) and (3) below and displayed for the user.

$$A_H = (2 * (\arctan(H_{size} / (2 * L_F)))) * (180/\pi) \quad (2)$$

$$A_V = (2 * (\arctan(V_{size} / (2 * L_F)))) * (180/\pi) \quad (3)$$

Where $A_H$ is the horizontal angle of view, $A_V$ is the vertical angle of view, $H_{size}$ is the horizontal sensor size, $V_{size}$ is the vertical sensor size, and $L_F$ is the focal length.

If the user selects a different target distance, the required focal length will be recalculated and displayed as described above. Likewise, if the user selects a different camera model, object type, or desired visual acuity index level, the maximum field of view will be recalculated and updated in the display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the invention as described herein and/or by the following claims are desired to be protected.

For example, a person of ordinary skill in the computer software art will recognize that the client and/or server arrangements, user interface and display content, and/or data layouts as described in the examples discussed herein could be organized differently on one or more computers to include fewer or additional options or features than as portrayed in the examples and still be within the spirit of the invention.

What is claimed is:

1. An apparatus for assessing visual acuity comprising:
    a processor;
    a memory operatively connected to the processor;
    an electronic display operatively connected to the processor; and
    a user input device;
    wherein the apparatus is configured to prompt the user to select an object type to be evaluated by a selected camera and a desired visual acuity index level;
    wherein said desired visual acuity index level and a sample image of the selected object type is displayed on said display, said image having a level of visual acuity matching the desired visual acuity index level; and
    wherein the apparatus executes computer readable instructions to determine the maximum allowable field of view that is achievable using the selected camera while maintaining the desired visual acuity index level; and
    wherein the apparatus further comprises a data store operatively connected to the processor for maintaining a plurality of sample images, a first one of said plurality of sample images representing a first object type and a first displayed visual acuity index level, a second one of said plurality of sample images representing the first object type and a second displayed visual acuity index level.

2. The apparatus of claim 1, wherein the apparatus is further configured to prompt the user to select a desired target distance from an object being imaged to the selected camera;
    wherein the display is configured to display a required focal length setting of the selected camera, said focal length setting required to maintain the desired level of visual acuity; and
    wherein said required focal length setting is displayed on the display.

3. The apparatus of claim 1, wherein the display presents the user with a series of preset visual acuity index levels to select from.

4. The apparatus of claim 1, wherein the apparatus uses the selected level of visual acuity to calculate a pixel density required to meet the selected visual acuity index level; and
    wherein the apparatus further uses the pixel density and an available pixel count of the sensor to calculate the maximum field of view value; and wherein said maximum field of view is displayed for the user on the display.

5. The apparatus of claim 4, wherein an object type factor is used to adjust the required pixel density based on the object type being imaged.

6. An apparatus for assessing visual acuity comprising:
    a processor;
    a memory operatively connected to the processor;
    an electronic display operatively connected to the processor; and
    a user input device;
    wherein the apparatus is configured to prompt the user to select an object type to be evaluated by a selected camera and a desired visual acuity index level;
    wherein a sample image of the selected object type is displayed on said display, said image having a level of visual acuity matching the desired visual acuity index level; and
    wherein the apparatus executes computer readable instructions to determine the maximum allowable field of view that is achievable using the selected camera while maintaining the desired visual acuity index level;
    wherein the visual acuity index level is determined by taking the base-10 log of a pixel density required to achieve the desired visual acuity index level to determine a first value and dividing the first value by six.

7. A method for generating and displaying a visualization of the visual acuity of an image that will be produced using a selected camera in a video surveillance system, comprising:
    maintaining a plurality of sample images within a computer database, a first one of said images representing a first object type and a first visual acuity index level; a second one of said images representing the first object type and a second visual acuity index level;
    prompting a user to select an object type and a desired visual acuity index level;
    retrieving one of said first and second images from the database, said retrieved image having a level of visual acuity matching the desired visual acuity index level, said retrieved image depicting the selected object type;
    displaying said desired visual acuity index level and said retrieved image on an electronic display.

8. The method of claim 7, wherein a first computer is used to provide said prompting of the user and a second computer is used to maintain said computer database; and wherein said first computer and said second computer are operatively connected to a network, said network providing communication between said first and second computers.

9. The method of claim 8, further comprising:
prompting the user to select a desired target distance from an object being imaged to the selected camera;
determining the required focal length setting for the selected camera, said focal length setting required to maintain the desired level of visual acuity; and
displaying said focal length requirement on the electronic display in conjunction with said retrieved image.

10. The method of claim 8, further comprising:
providing a series of preset visual acuity index levels on the electronic display; wherein the user is able to select one of said preset visual acuity index levels.

11. The method of claim 8, further comprising:
determining the pixel density required to achieve the selected visual acuity index level;
determining the maximum field of view based on the required pixel density and the available pixel count of a sensor within said camera; and
displaying said maximum field of view on the electronic display in conjunction with said first image.

12. The method of claim 11, wherein an object type factor is used to adjust the required pixel density based on the object type being imaged.

13. A method for generating and displaying a visualization of the visual acuity of an image that will be produced using a selected camera in a video surveillance system, comprising:
maintaining a plurality of images within a computer database, said plurality of images corresponding to a plurality of visual acuity index levels and a plurality of object types;
prompting a user to select an object type and a desired visual acuity index level;
retrieving a first one of said images from the database, said first image having a level of visual acuity matching the desired visual acuity index level, said image depicting the selected object type; and
displaying said first image on an electronic display;
wherein the visual acuity index level is determined by taking the base-10 log of a pixel density required to achieve the desired visual acuity index level to determine a first value and dividing said first value by six.

* * * * *